(12) United States Patent
Hong

(10) Patent No.: US 9,557,788 B2
(45) Date of Patent: Jan. 31, 2017

(54) SEMICONDUCTOR MEMORY DEVICE INCLUDING ARRAY E-FUSE

(71) Applicant: SK hynix Inc., Gyeonggi-do (KR)

(72) Inventor: Yun-Seok Hong, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 293 days.

(21) Appl. No.: 14/081,730

(22) Filed: Nov. 15, 2013

(65) Prior Publication Data
US 2015/0006926 A1    Jan. 1, 2015

(30) Foreign Application Priority Data
Jun. 28, 2013 (KR) .................. 10-2013-0075068

(51) Int. Cl.
*G06F 1/26* (2006.01)
*G06F 1/32* (2006.01)

(52) U.S. Cl.
CPC .. *G06F 1/26* (2013.01); *G06F 1/32* (2013.01)

(58) Field of Classification Search
CPC ................................ G06F 1/26; G06F 1/3234
See application file for complete search history.

(56) References Cited

U.S. PATENT DOCUMENTS

| 6,088,281 | A | * | 7/2000 | Miyakawa | G11C 17/12 365/185.09 |
|---|---|---|---|---|---|
| 6,304,039 | B1 | * | 10/2001 | Appelberg | H05B 33/08 315/169.3 |
| 7,542,348 | B1 | * | 6/2009 | Kim | G11C 7/18 365/185.11 |
| 7,728,717 | B2 | * | 6/2010 | Rebholz-Goldmann | 340/286.01 |
| 2005/0174159 | A1 | * | 8/2005 | Rozen et al. | 327/333 |
| 2006/0133147 | A1 | * | 6/2006 | Lee | G11C 16/30 365/185.18 |
| 2007/0081377 | A1 | * | 4/2007 | Zheng | G11C 7/20 365/96 |
| 2009/0278591 | A1 | * | 11/2009 | Pyeon | G11C 5/145 327/536 |
| 2014/0056084 | A1 | * | 2/2014 | Jeong et al. | 365/189.09 |
| 2014/0340122 | A1 | * | 11/2014 | Savanth et al. | 327/50 |

FOREIGN PATENT DOCUMENTS

KR    1020100062147    6/2010

\* cited by examiner

*Primary Examiner* — Nitin Patel
*Assistant Examiner* — Kevin Stewart
(74) *Attorney, Agent, or Firm* — IP & T Group LLP

(57) ABSTRACT

A semiconductor device includes a fuse unit comprising an array e-fuse and suitable for generating a boot-up end signal when a boot-up operation ends, a power generation unit suitable for generating a plurality of driving voltages for the fuse unit in response to a power-up signal indicating start of the boot-up operation and a power control unit suitable for controlling the generation of the driving voltages in response to the power-up signal and the boot-up end signal.

14 Claims, 4 Drawing Sheets

SEMICONDUCTOR MEMORY DEVICE INCLUDING ARRAY E-FUSE

CROSS-REFERENCE TO RELATED APPLICATIONS

The present application claims priority of Korean Patent Application No. 10-2013-0075068 filed on Jun. 28, 2013, which is incorporated herein by reference in its entirety.

BACKGROUND

1. Field

Exemplary embodiments of the present invention relate to a semiconductor device having an array e-fuse, and more particularly, to a power gating technique for controlling power that is supplied to an array e-fuse.

2. Description of the Related Art

In general, each of a PMOS transistor and an NMOS transistor included in a dynamic random access memory (DRAM) has a threshold voltage Vth. Thus, an external voltage VDD equal to or more than 2*Vth corresponding to a sum of the threshold voltages of the PMOS transistor and the NMOS transistor should be basically secured to stabilize an operation region. Therefore, the DRAM requires a power-up signal generator to generate a power-up signal PWRUP indicating that the external voltage VDD reaches a required voltage level. The power-up signal generator outputs the power-up signal PWRUP that pulses to a logic high level once when the voltage level of the external voltage VDD is equal to or higher than a predetermined voltage level or a target voltage level and the external voltage VDD is stabilized. In response to the power-up signal PWRUP, an internal circuit performs an operation with the stabilized external voltage VDD. With high integration of semiconductor devices, a chip size of the device has been reduced and the operating voltage has also been reduced. Furthermore, a deep power down mode has been employed to reduce undesired power consumption.

Electrical fuses arranged in an array inside a semiconductor device are referred to as an array e-fuse. During a boot-up operation, all of data of the array e-fuse are read and stored in an internal latch for a power-up time after application of the external power supply voltage VDD. For the boot-up operation, it is required to read all of data stored in the array e-fuse before the semiconductor device starts performing a normal operation. In a case of a conventional metal fuse, fuse data is automatically stored in a latch during the boot-up operation depending on whether or not the metal fuse was cut. In a case of the array e-fuse, however, a boot-up read operation needs to be performed once at a time to read data on each cell or e-fuse during the boot-up operation. The boot-up operation needs to be performed within the power-up time that is a setup time for operation of the semiconductor device. Thus, the amount of fuse data to be read at a time becomes greater as the size of the array e-fuse becomes greater. In the case of a semiconductor device including the array e-fuse, the threshold voltage of which is relatively low, current consumption needs to be reduced. Therefore, when the semiconductor device includes transistors operating at a low voltage, that is, having low threshold voltages Vth, the semiconductor device may be operated at high speed, but current leakage may be increased. As a result, since the current leakage increases during a normal operation of the semiconductor device, additional current consumption occurs when the array e-fuse is used.

SUMMARY

Various embodiments are directed to a semiconductor device having an array e-fuse and capable of reducing power consumption by preventing supply of a driving voltage to the array e-fuse after a boot-up operation.

In an exemplary embodiment, a semiconductor device may include: a fuse unit comprising an array e-fuse and suitable for generating a boot-up end signal when a boot-up operation ends, a power generation unit suitable for generating a plurality of driving voltages for the fuse unit in response to a power-up signal indicating start of the boot-up operation and a power control unit suitable for controlling the generation of the driving voltages in response to the power-up signal and the boot-up end signal.

In an exemplary embodiment, a method for driving a semiconductor device including an array e-fuse may include: generating a power-up signal when a boot-up operation starts, performing the boot-up operation by generating a plurality of driving voltages for the array e-fuse in response to the power-up signal, generating a boot-up end signal when a boot-up operation ends and preventing the generation of the driving voltages in response to the boot-up end signal.

In an exemplary embodiment, a semiconductor device may include: a power generation unit suitable for generating a plurality of driving voltages in response to a power-up signal indicating start of a boot-up operation and a power control unit suitable for controlling the generation of the driving voltages in response to the power-up signal and a boot-up end signal indicating end of the boot-up operation.

DETAILED DESCRIPTION

Figure 1:
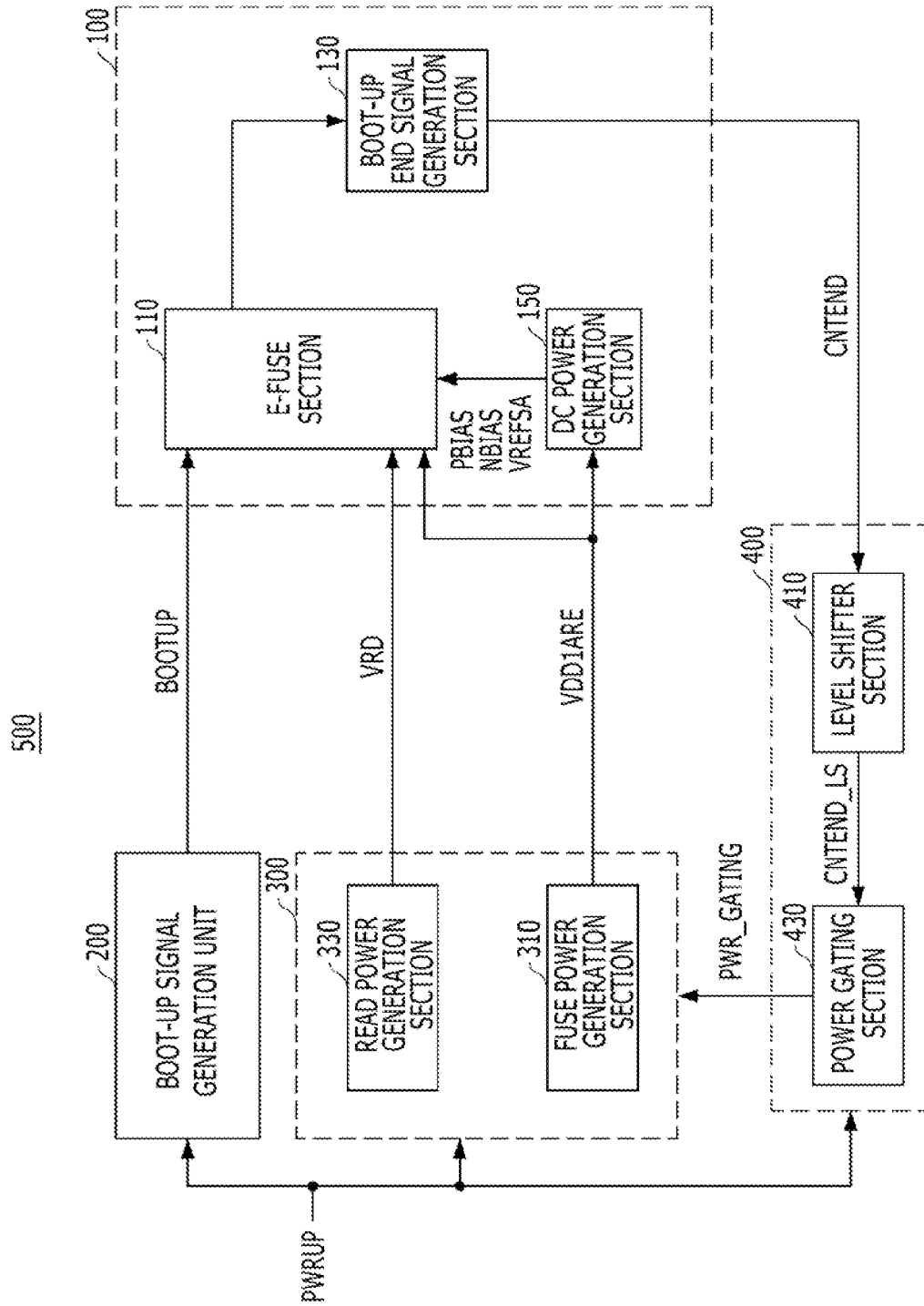
FIG. 1 is a block diagram illustrating a semiconductor device in accordance with an exemplary embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a block diagram illustrating a semiconductor device in accordance with an exemplary embodiment of the present invention.

Referring to FIG. 1, the semiconductor device 500 may include a fuse unit 100, a boot-up signal generation unit 200, a voltage generation unit 300 and a voltage control unit 400.

The fuse unit 100 may include an e-fuse section 110 comprising a plurality of array e-fuses. The fuse unit 100 may include a DC power generation section 150 suitable for generating a plurality of voltages PBIAS, NBIAS and VREFSA used in the e-fuse section 110. The fuse unit 100 may further include a boot-up end signal generation section 130 suitable for generating a boot-up end signal CNTEND when a boot-up operation ends after the e-fuse section 110 starts the boot-up operation and reads all of data stored in the plurality of array e-fuses.

The boot-up signal generation unit 200 may generate a boot-up signal BOOTUP in response to a power-up signal PWRUP. The power-up signal PWRUP may be a trigger signal that is generated according to the level of power to be used in the semiconductor device 500.

The voltage generation unit 300 may provide a read driving voltage VRD for a boot-up read operation of the plurality of array e-fuses of the e-fuse section 110 and an array e-fuse driving voltage VDD1ARE to the fuse unit 100 in response to the power-up signal PWRUP.

The voltage control unit 400 may receive the boot-up end signal CNTEND from the fuse unit 100 and control the voltage generation unit 300 in order to prevent the voltage generation unit 300 from providing the plurality of driving voltages VRD and VDD1ARE to the fuse unit 100 after completion of the boot-up operation. The voltage control unit 400 may include a level shifter section 410 suitable for shifting the level of the boot-up end signal CNTEND to the level of an internal voltage VPERI and outputting an internal boot-up end signal CNTEND_LS. The voltage control unit 400 may further include a power gating section 430 suitable for outputting a control signal PWR_GATING based on the internal boot-up end signal CNTEND_LS for controlling output of the driving voltages VRD and VDD1ARE.

Hereinafter, an operation of the semiconductor device shown in FIG. 1 is explained in detail.

A power-up signal PWRUP may pulse to a logic high level when a voltage level of the external voltage is equal to or higher than a target voltage level and the external voltage is stabilized. The boot-up signal generation unit 200 may generate a boot-up signal BOOTUP in response to the power-up signal PWRUP. The e-fuse section 110 may start the boot-up operation in response to the boot-up signal BOOTUP and the driving voltages VRD and VDD1ARE. When the boot-up operation ends, the boot-up end signal generation section 130 of the fuse unit 100 may output the boot-up end signal CNTEND of a logic high level. At this time, the level of the boot-up end signal CNTEND corresponds to the level of the array e-fuse driving voltage VDD1ARE. The level shifter section 410 of the voltage control unit 400 may shift the boot-up end signal CNTEND to the level of an internal voltage VPERI to output the internal boot-up end signal CNTEND_LS. Then, the power gating section 430 may output the control signal PWR_GATING to the voltage generation unit 300 based on the internal boot-up end signal CNTEND_LS of the logic high level. As a negative gate bias is applied to a PMOS transistor provided in the voltage generation unit 300 the plurality of driving voltages, that is, the array e-fuse driving voltage VDD1ARE and the read driving voltage VRD are floated. Accordingly, when the boot-up operation ends, the DC power generation section 150 in response to the floated array e-fuse driving voltage VDD1ARE and the floated read driving voltage VRD may stop providing a plurality of powers or the plurality of voltages PBIAS, NBIAS and VREFSA to the e-fuse section 110 thereby reducing current consumption that may be caused by the e-fuse section 110 after completion of the boot-up operation.

Figure 2:
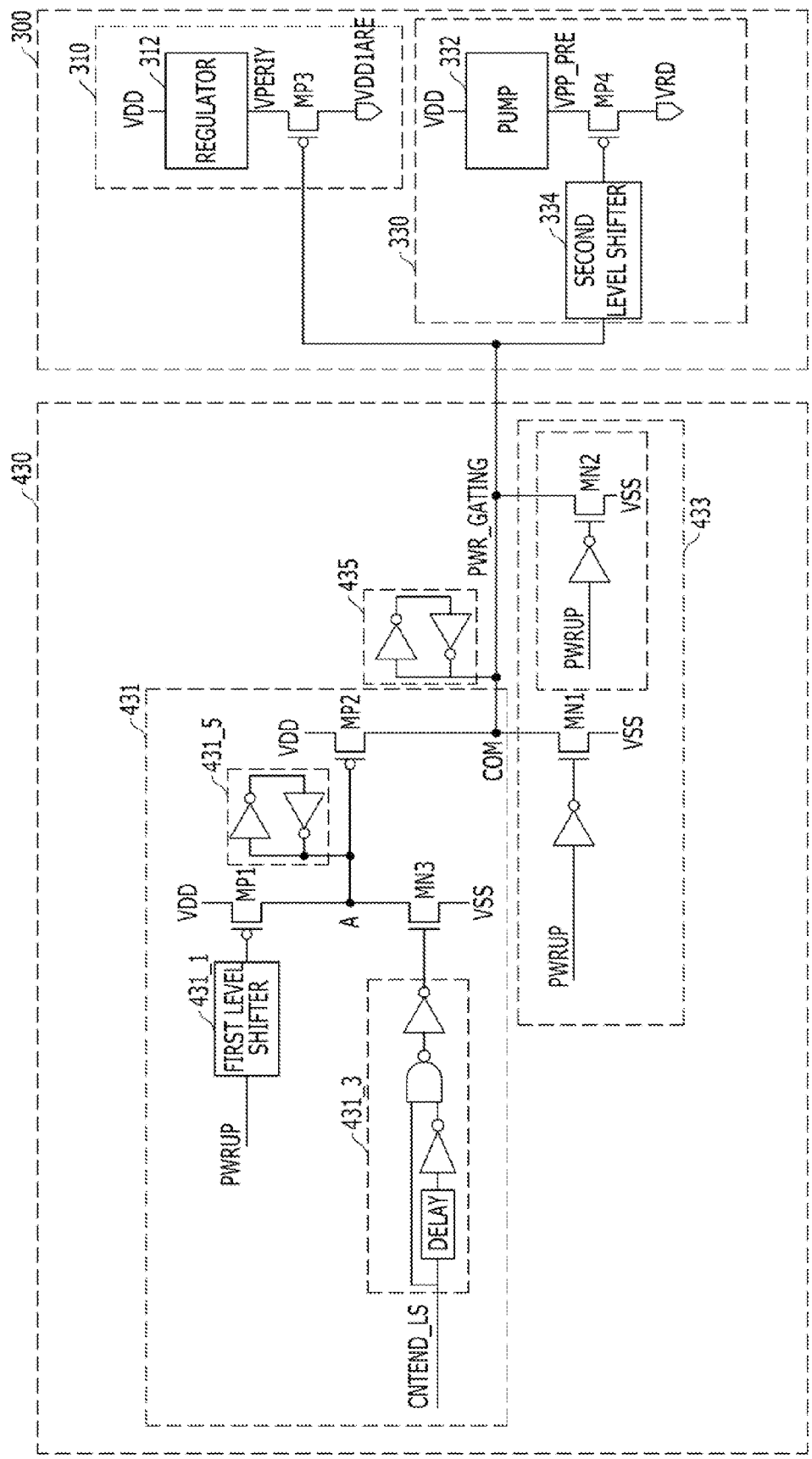
FIG. 2 is a circuit diagram illustrating a power generation unit and a power gating section of the semiconductor device shown in FIG. 1.

FIG. 2 is a circuit diagram illustrating the power generation unit 300 and the power gating section 430 of the semiconductor device 500 shown in FIG. 1.

The power-up signal PWRUP may be a trigger signal that is generated according to the level of power to be used in the semiconductor device 500. The power-up signal PWRUP may be generated when the level of a power supply voltage VDD reaches a target point. The power supply voltage VDD is taken as an example in the description and other power supply voltages may fall in the scope of the exemplary embodiment of the present invention.

The power gating section 430 may include the pull-up part 431, the pull-down part 433 and a latch part 435. The latch part 435 may be coupled to a common node COM of the pull-up part 431 and the pull-down part 431 The control signal PWR_GATING for controlling output of the driving voltages VRD and VDD1ARE is outputted at the common node COM to the voltage generation unit 300.

The pull-down part 433 may include a first NMOS transistor MN1 and a second NMOS transistor MN2. The first NMOS transistor MN1 may be coupled between the common node COM and a ground voltage VSS and receive at its gate the power-up signal PWRUP inverted by an inverter. The second NMOS transistor MN2 may be coupled between the common node COM and the ground voltage VSS and receive at its gate the power-up signal PWRUP inverted by an inverter.

The pull-up part 431 may include a first PMOS transistor MP1, a second PMOS transistor MP2, a third NMOS transistor MN3, a first level shifter 431_1 suitable for shifting the power-up signal PWRUP to a level of the power supply voltage VDD to provide the shifted power-up signal PWRUP to the first PMOS transistor MP1 and a pulse generator 431_3 suitable for generating a pulse based on the internal boot-up end signal CNTEND_LS. The first PMOS transistor MP1 may be coupled between the power supply voltage VDD and a gate of the second PMOS transistor MP2 and receive at its gate the shifted power-up signal PWRUP outputted from the first level shifter 431_1. The third NMOS transistor MN3 may be coupled between the gate of the second PMOS transistor MP2 and the ground voltage VSS and receive at its gate the pulse outputted from the pulse generator 431_3. The pulse generated by the pulse generator 431_3 may pulse once to a logic high level when the boot-up operation ends because the levels of the boot-up end signal CNTEND and the internal boot-up end signal CNTEND_LS may be changed from a logic low level to a logic high level when the boot-up operation ends. The second PMOS transistor MP2 may be coupled between the power supply voltage VDD and the common node COM and coupled at its gate to the first PMOS transistor MP1 and the third NMOS transistor MN3. The pull-up part 431 may further include an inverter latch 431_5 coupled between the common node COM and the gate of the second PMOS transistor MP2. During the boot-up operation, a voltage level of the gate of the second PMOS transistor MP2 may be maintained at a logic high level by the power-up signal PWRUP that may pulse when the power-up operation starts and the inverter latch 431_5 that may latch the power supply voltage VDD.

Referring to FIGS. 1 and 2, the voltage generation unit 300 may include a fuse power generation section 310 and a read power generation section 330. The fuse power generation section 310 may generate the array e-fuse driving voltage VDD1ARE and the read power generation section 330 may generate the read driving voltage VRD for a boot-up read operation of the array e-fuses of the e-fuse section 110.

The fuse power generation section 310 may include a regulator 312 and a third PMOS transistor MP3. The regulator 312 regulates the power supply voltage VDD to output a regulated voltage VPERIY with a level of the internal voltage VPERI. The third PMOS transistor MP3 may receive the regulated voltage VPERIY and outputs the array e-fuse driving voltage VDD1ARE in response to the control signal PWR_GATING outputted from the power gating section 430.

The regulator 312 of the fuse power generation section 310 may receive the power supply voltage VDD as a source voltage, down-convert the power supply voltage VDD, and generate the regulated voltage VPERIY with the level of the internal voltage VPERI. When the third PMOS transistor MP3 is turned on because of the control signal PWR_GATING with a logic low level, the third PMOS transistor MP3 may output the array e-fuse driving voltage VDD1ARE based on the regulated voltage VPERIY. When the boot-up operation ends, the third PMOS transistor MP3 may be turned off because of the control signal PWR_GATING with a logic high level and the array e-fuse driving voltage VDD1ARE may be floated.

The read power generation section 330 may include a pump 332, a fourth PMOS transistor MP4 and a second level shifter 334. The pump 332 may perform a pumping operation to the power supply voltage VDD in order to output a high voltage VPP_PRE of a high voltage level according to whether or not the power supply voltage VDD corresponds to a level of a high voltage VPP. The fourth PMOS transistor MP4 may receive the high voltage VPP_PRE and outputs the read driving voltage VRD in response to the control signal PWR_GATING that is shifted to a level of the high voltage VPP_PRE by the second level shifter 334.

The pump 332 of the read power generation section 330 may receive the power supply voltage VDD as a source voltage and generate the high voltage VPP_PRE at the high voltage level. When the fourth PMOS transistor MP4 is turned on because of the control signal PWR_GATING with a logic low level, the fourth PMOS transistor MP4 may output the read driving voltage VRD for the boot-up read operation based on the high voltage VPP_PRE, When the boot-up operation ends, the fourth PMOS transistor MP4 may be turned off because of the control signal PWR_GATING with a logic high level and the read driving voltage VRD may be floated.

Hereinafter, an operation of the voltage generation unit 300 and the power gating section 430 is explained.

When the power supply voltage VDD reaches the target level, the power-up signal PWRUP may pulse once to a logic low level. At the start of the power up operation, since the power-up signal PWRUP may pulse to a logic low level and thus the level of the control signal PWR_GATING at the common node COM may become a logic low level, which leads turn-on of the third PMOS transistor MP3 and the fourth PMOS transistor MP4, and thus generation of the array e-fuse driving voltage VDD1ARE and the read driving voltage VRD for the boot-up read operation by the fuse power generation section 310 and the read power generation section 330 of the voltage generation unit 300, respectively. Also at the start of the power-up operation, in response to the power-up signal PWRUP of a logic low level, the voltage level of the gate of the second PMOS transistor MP2 becomes a logic high level. During the boot-up operation, the internal boot-up end signal CNTEND_LS is deactivated to a logic low level. When the power-up operation ends, even though the level of the power-up signal PWRUP may be a logic high level, the voltage level of the gate of the second PMOS transistor MP2 may be changed to a logic low level. As described above, the pulse generated by the pulse generator 431_3 may pulse once to the logic high level when the boot-up operation ends because the levels of the boot-up end signal CNTEND and the internal boot-up end signal CNTEND_LS may be changed from a logic low level to a logic high level when the boot-up operation ends. The pulse at the end of the boot-up operation may sequentially turn on the third NMOS transistor MN3 and the second PMOS transistor MP2, and thus make the voltage level of the control signal PWR_GATING changed to the logic high level. Thus, the fuse power generation section 310 and the read power generation section 330 may generate the floated array e-fuse driving voltage VDD1ARE and the floated read driving voltage VRI by the control signal PWR_GATING with the voltage level of the logic high level. As described above, the floated array e-fuse driving voltage VDD1ARE and the floated read driving voltage VRD prevent supply of the plurality of voltages PBIAS, NBIAS and VREFSA to the array e-fuse after the boot-up operation.

Figure 3:
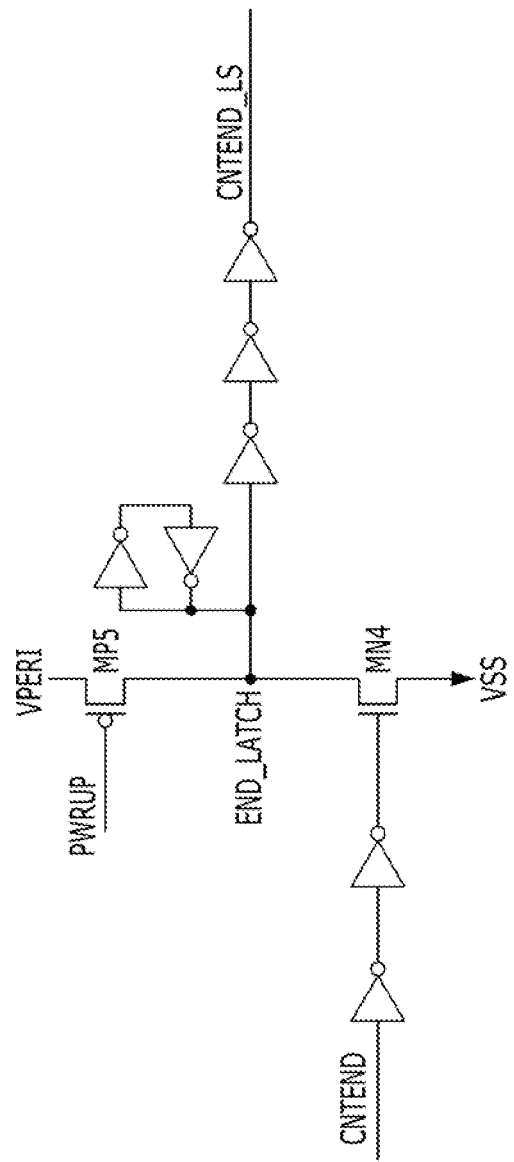
FIG. 3 is a circuit diagram illustrating a level shifter section of the semiconductor device shown in FIG. 1.

FIG. 3 is a circuit diagram illustrating the level shifter section 410 of the semiconductor device 500 shown in FIG. 1.

Referring to FIG. 3, the level shifter section 410 may shift a level of the boot-up end signal CNTEND outputted from the fuse unit 100 to the internal voltage VPERI and output the shifted signal CNTEND_LS to the power gating section 430. The level shifter section 410 may include a PMOS transistor MP5 and a NMOS transistor MN4 coupled in serial between the internal voltage VPERI and the ground voltage VSS. The drains of the PMOS transistor MP5 and the NMOS transistor MN4 are connected to a node END_LATCH. The node END_LATCH is connected to a latch and serially coupled inverters that operate at the internal voltage VPERI.

The operation of the level shifter section 410 will be described as follows.

When the power-up operation starts, the pulse of the power-up signal PWRUP is applied at a logic low level, the boot-up end signal CNTEND has a logic low level and thus the node END_LATCH is maintained at a logic high level through the PMOS transistor MP5 due to the internal voltage VPERI during the power-up operation. On the other hand, when the boot-up operation ends and thus the boot-up end signal CNTEND becomes a logic high level, the node END_LATCH may be grounded by the NMOS transistor MN4 and the internal boot-up end signal CNTEND_LS may be outputted with the level of the internal voltage VPERI by the inverters operating at the internal voltage VPERI, which means that the voltage level of the boot-up end signal CNTEND is shifted to the level of the internal voltage VPERI and then outputted as the internal boot-up end signal CNTEND_LS, When the boot-up end signal CNTEND at the level of the array e-fuse driving voltage VDD1ARE, which is outputted from the fuse unit 100, is used without passing through the level shifter section 410, the array e-fuse driving voltage VDD1ARE is floated while the power is adjusted by the power gating. As a result, the boot-up end signal CNTEND is floated at the same time as the boot-up operation ends. However, the internal boot-up end signal CNTEND_LS, of which the level is shifted to the internal voltage VPERI, may be securely transmitted to the power gating section 430 even though the boot-up operation ends.

Figure 4:
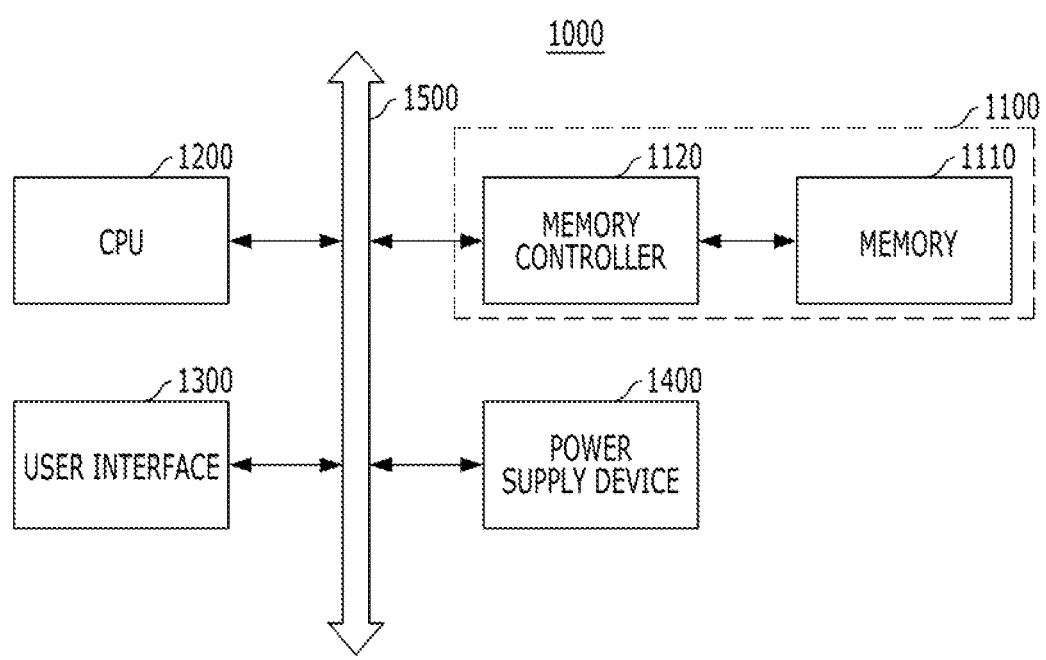
FIG. 4 is a block diagram illustrating an information processing system including a semiconductor device in accordance with an exemplary embodiment of the present invention.

FIG. 4 is a block diagram illustrating an information processing system a semiconductor device in accordance with an exemplary embodiment of the present invention.

Referring to FIG. 4, the information processing system 1000 may include a memory system 1100, a CPU 1200, a user interface 1300, and a power supply device 1400, which perform data communication through a bus 1500.

The memory system 1100 may include a device 1110 and a memory controller 1120. The device 1110 may store data processed by the CPU 1200 or data inputted from outside through the user interface 1300. The device 1100 may include the power gating circuit proposed through the above-described embodiments.

The information processing system 1000 may be applied to all types of electronic devices that need to store data, for example, a variety of mobile devices such as a memory card, a solid state disk (SSD) a smart phone and the like.

As described above, according to various embodiments of the present invention, the semiconductor device having an array e-fuse may reduce power consumption by preventing supply of a driving voltage to the array e-fuse after the boot-up operation.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
a fuse unit comprising an array e-fuse and configured to generate a boot-up end signal indicating end of a boot-up operation;
a power generation unit configured to generate a plurality of driving voltages for the fuse unit in response to a power-up signal indicating start of the boot-up operation; and
a power control unit configured to control the generation of the driving voltages in response to the power-up signal and the boot-up end signal, wherein the power control unit prevents the power generation unit from providing the driving voltages to the fuse unit in response to the boot-up end signal,
wherein the power control unit includes:
a level shifter section configured to shift the boot-up end signal to a level of an internal voltage to output an internal boot-up end signal; and
a power gating section configured to control the generation of the driving voltages in response to the internal boot-up end signal, wherein the power gating section includes a pull-up part configured to pull up an output node of the power gating section in response to the internal boot-up end signal; and a pull-down part configured to pull down the output node in response to the power-up signal.

2. The semiconductor device of claim 1, wherein the power generation unit comprises:
a fuse power generation section configured to generate an array e-fuse driving voltage in response to the power-up signal; and
a read power generation section configured to generate a read voltage for a boot-up read operation in response to the power-up signal.

3. The semiconductor device of claim 2, wherein the fuse power generation section comprises a regulator configured to regulate a level of a power supply voltage to a level of an internal voltage.

4. The semiconductor device of claim 2, wherein the read power generation section comprises a pump configured to perform a pumping operation for outputting a high voltage according to whether or not a power supply voltage is at a high voltage level.

5. The semiconductor device of claim 1, wherein the fuse unit comprises a DC power generation section configured to generate a plurality of voltages based on one or more of the driving voltages.

6. The semiconductor device of claim 1, wherein the fuse unit comprises a boot-up end signal generation section configured to generate the boot-up end signal when the boot-up operation ends.

7. The semiconductor device of claim 1, wherein the pull-up part comprises a PMOS transistor and the pull-down part comprises an NMOS transistor.

8. The semiconductor device of claim 1,
wherein the output node is coupled between the pull-up part and the pull-down part, and the generation of the driving voltages is controlled by a signal at the output node.

9. The semiconductor device of claim 1, wherein the power gating section further comprises a latch part configured to latch the signal at the output node.

10. The semiconductor device of claim 8, wherein the power generation unit comprises:
a fuse power generation section configured to generate an array e-fuse driving voltage in response to the signal at the output node; and
a read power generation section configured to generate a read voltage for a boot-up read operation in response to the signal at the output node.

11. The semiconductor device of claim 10, wherein the fuse power generation section comprises:
a regulator configured to regulate a level of a power supply voltage to a level of an internal voltage; and
a first transistor configured to output the regulated voltage as the array e-fuse driving voltage in response to the signal at the output node.

12. The semiconductor device of claim 10, wherein the read power generation section comprises:
a pump configured to perform a pumping operation for outputting a high voltage according to whether a power supply voltage is at a high voltage level; and
a second transistor configured to output the high voltage as the read driving voltage in response to the signal at the output node.

13. The semiconductor device of claim 12, wherein the read power generation section further comprises a level shifter configured to shift the signal at the output node to a level of the high voltage.

14. A method for operating a semiconductor device comprising:
generating a boot-up end signal indicating end of a boot-up operation by a fuse unit comprising an array e-fuse;
generating a plurality of driving voltages for the fuse unit in response to a power-up signal indicating start of the boot-up operation by a power generation unit; and controlling the generating of the plurality of driving voltages in response to the power-up signal and the boot-up end signal by a power control unit, wherein the power control unit prevents the power generation unit from providing the driving voltages to the fuse unit in response to the boot-up end signal, wherein the power control unit includes:

a level shifter section configured to shift the boot-up end signal to a level of an internal voltage to output an internal boot-up end signal; and a power gating section configured to control the generation of the driving voltages in response to the internal boot-up end signal, wherein the power gating section includes a pull-up part configured to pull up an output node of the power gating section in response to the internal boot-up end signal; and a pull-down part configured to pull down the output node in response to the power-up signal.

* * * * *